Sept. 7, 1948.  R. A. GIVEN ET AL  2,448,971

PROCESS FOR STRIPPING IN BUTADIENE EXTRACTION

Filed Jan. 4, 1944

Richard A. Given  Inventors
William S. Craft
By ⟨signature⟩ Attorney

Patented Sept. 7, 1948

2,448,971

UNITED STATES PATENT OFFICE 2,448,971

PROCESS FOR STRIPPING IN BUTADIENE EXTRACTION

Richard A. Given, Lake Charles, La., and William S. Craft, Elizabeth, N. J., assignors to Standard Oil Development Company, a corporation of Delaware Application January 4, 1944, Serial No. 516,930

2 Claims. (Cl. 260—681.5)

This invention relates to improvements in the separation and concentration of diolefins from mixtures of saturated and unsaturated hydrocarbons containing diolefins and relates particularly to the separation and concentration of butadiene by the use of a cuprous salt solution.

Organic products obtained on cracking petroleum, brown coal, brown coal tar, synthetic paraffins and the like in the presence or absence of additional gas or vapors such as steam, hydrogen, nitrogen, carbon dioxide and the like, frequently contain both olefins and diolefins that are gaseous at ordinary temperatures and pressures. It is very difficult to separate the gaseous product into its component parts even by refrigeration as the boiling points of the said olefins and diolefins lie very close, for example, in the case of butylene and butadiene, the boiling points of which are −1° C. and −5° C. A method used extensively at present in the separation and concentration of the olefin or diolefin is one where a solvent is used to extract the desired olefin or diolefin which is thereafter separated from the solvent. A solvent used extensively is an aqueous solution of ammoniacal cuprous salt. One of the difficulties encountered in using the ammoniacal cuprous salt is that the solution of either the diolefin or olefin generally contains a small fraction of other less soluble ingredients. When butadiene is absorbed by ammoniacal cuprous acetate, the solution contains both the diolefin and a small fraction of the olefin.

A complication encountered is that in evaporating off the olefin from the solution of diolefin and olefin in ammoniacal cuprous acetate, there is also a tendency for the ammonia to separate, with the resulting precipitation of a complex diolefin-cuprous salt addition product.

An object of this invention is to selectively separate the less soluble olefins from an ammoniacal cuprous salt solution containing olefins and diolefins. Another object of this invention is to separate diolefins without a substantial loss of ammonia. These and other objects of the invention will be clearly understood upon reading the following description with reference to the accompanying drawing, Figure 1 showing a flow sheet of the process and Figure 2 a sectional sketch of the desorber.

Figure 1:
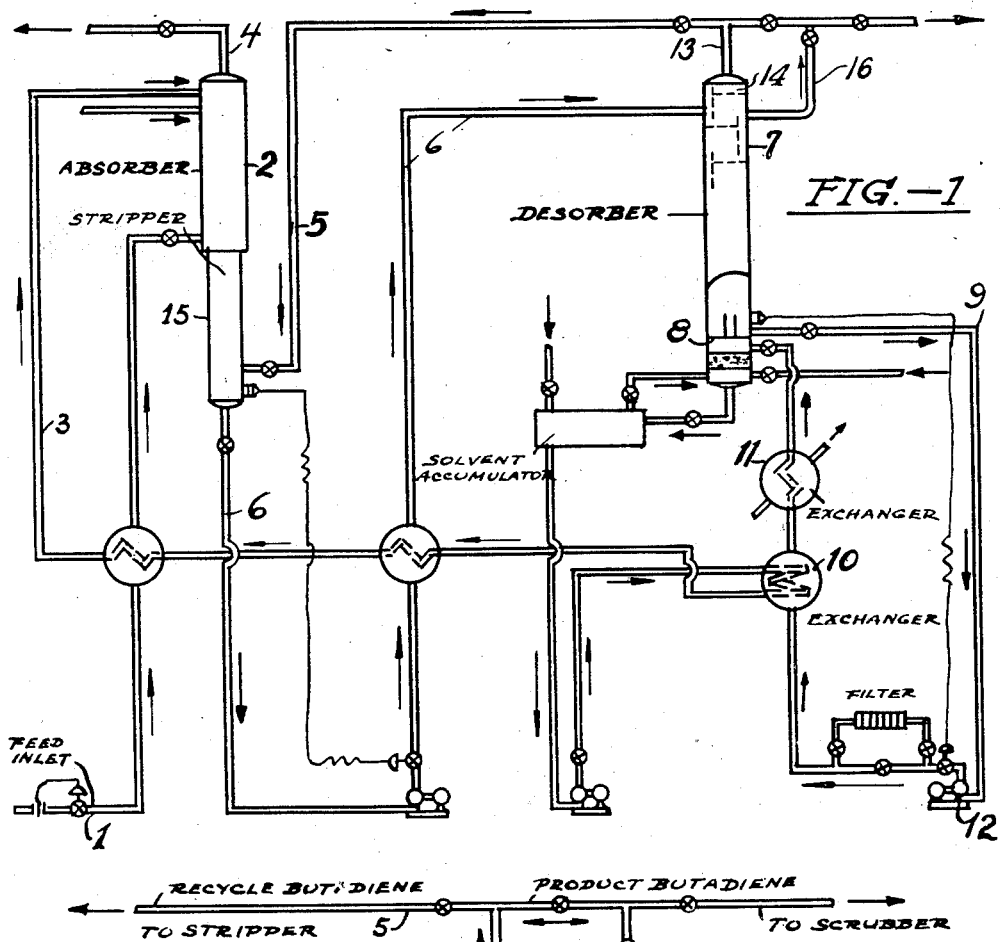

Referring to Figure 1, hydrocarbon feed vapors consisting of olefins and diolefins plus some other minor impurities enter extractor 2 through line 1. This tower contains either bubble plates or packed sections and operates at about 0 pounds per square inch and 25° F. Ammoniacal cuprous acetate solvent enters the top of extractor 2 through line 3 and flows down the tower countercurrently to the hydrocarbon vapors rising in the tower. The unabsorbed hydrocarbon vapors leave the top of extractor 2 through line 4. The solvent leaving the bottom of extractor 2 contains dissolved hydrocarbon consisting principally of diolefin. However, about 10 to 20% of olefins are also dissolved in the solvent and must be selectively removed. The solvent flows from extractor 2 through stripper 15 wherein it is contacted countercurrently with recycled butadiene vapors introduced into the bottom of stripper 15 through line 5. The olefins are stripped from solution and the solvent leaving the bottom of stripper 15 through line 6 contains essentially only dissolved diolefins. Suitable pump means and automatic valve means may be provided to control the level of the solution in the stripper and to regulate flow from the stripper, as indicated diagrammatically in Figure 1, and as will be obvious to those skilled in the art. This solvent is heated to 60–90° F. and enters the top of desorber 7 above the top plate. This desorber contains either bubble plates or a combination of plates and packed sections and is maintained at a pressure of 6 to 25 pounds per square inch. A considerable portion of the dissolved diolefin is flashed from solution and passes overhead from desorber 7. A portion or all of this vapor is recycled through line 5 to the bottom of stripper 15 wherein it strips olefin from the solvent. The partially desorbed solvent passes down through desorber 7 and is collected on pan 8. The solvent is withdrawn through line 9 by pump 12 and heated to 150–180° F. in heat exchanger 10 and heater 11, being returned to the tower below pan 8. As indicated in Figure 1, the level of the solvent retained in the desorber may be controlled by automatic valves of any suitable type. Essentially all the diolefin remaining in solution is rejected at this point. These vapors pass up through the tower contacting the descending cooler solvent, and product butadiene vapors are withdrawn from below the top plate. Lean solvent leaving the bottom of desorber 7, is cooled and recycled to absorber 2 through line 3.

Figure 2:
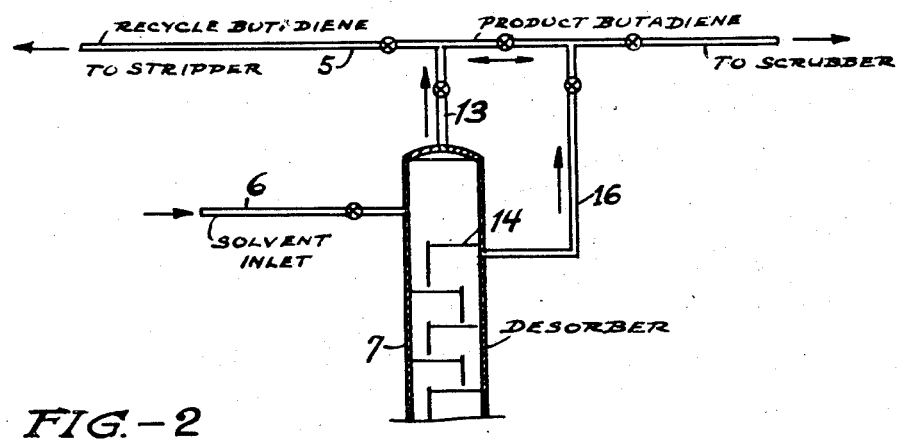

Referring to Figure 2, details are shown of the proposed system whereby an additional olefin stripping stage is obtained in the top of desorber 7. Solvent entering desorber 7 through line 6 rejects a considerable portion of the dissolved diolefin upon entering the tower on the top of plate 14. This flashing operation represents a portion of a stripping stage since any olefin remaining in the solvent entering desorber 7 will tend to be flashed off at this point. These flashed vapors are recycled to the stripper 15. Solvent flows down desorber 7 and the remainder of the dissolved diolefin together with ammonia and water, is rejected in the hot lower section of the tower. Vapors are withdrawn from below the top plate 14 through line 16 and constitute the butadiene product. These vapors are then sent to a water scrubber to remove ammonia. This ammonia is subsequently reconcentrated and returned to the system, in order to maintain the ammonia content of the solvent.

The extraction of butadiene from a dilute butadiene feed using ammoniacal cuprous acetate solvent invloves the following three steps:

1. *Absorption.*—In this step, the desired butadiene is dissolved in the solvent along with a small amount of undesired hydrocarbons. This step may be carried out with the hydrocarbon phase in either the liquid or vapor state.

2. *Stripping.*—In this step, the undesired hydrocarbons are removed from the solvent, leaving essentially pure butadiene in the solvent. The stripping may be carried out with the hydrocarbon phase in either the liquid or vapor state.

3. *Desorption.*—In this step, the pure butadiene is recoverd from the solvent by vaporization therefrom.

The flashed vapors pass overhead from the desorber and the solvent flows downward from this top zone to the bottom portion of the desorber wherein the rest of the butadiene is vaporized therefrom. The butadiene released in the lower parts of the desorber is taken from the side of the desorber just beneath the top flash zone. All or most of the desorber overhead vapors are recycled to the stripper. All or most of the vapors taken from the side go to storage as the product.

The advantages in using this process are that cold solvent has a higher capacity for butadiene than does warm solvent. Therefore, the solvent leaving the stripper of this invention has a larger quantity of dissolved butadiene than does the solvent leaving strippers used heretofore. By taking advantage of the additional stripping stage thus made available in the top of the desorber, a better separation between the undesired hydrocarbon and butadiene is effected in a given number of theoretical stages in the stripper.

The following table illustrates the magnitude of the reduction in solvent circulation rate which may be obtained when extracting a feed containing 20-22 mol per cent butadiene under the conditions of this invention:

| | High Temp. Vap. Phase Operation | Low Temp. Vap. Phase Operation |
|---|---|---|
| Absorber Top Temp., °F | 44 | 25 |
| Absorber Top Press., lbs./sq. in. gauge | 5 | 0 |
| Butadiene Recovery, per cent of Butadiene in fresh feed | 95 | 95 |
| Solvent Circulation Rate, lbs. Solvent per lb. Feed | 32 | 13 |

This invention has particular application in the extraction of butadiene from a dilute butadiene feed using ammoniacal cuprous acetate solvent. However, with modification, it might be applicable to other extraction systems, being different solvents.

What is claimed is:

1. In a process for the extraction of butadiene from a mixture of hydrocarbons containing both butadiene and butene by means of an ammoniacal cuprous acetate solution in which the ammoniacal cuprous acetate solution containing the dissolved butadiene and butene after it has contacted and has been separated from the said mixture of hydrocarbons is stripped of butene by passing in countercurrent flow to the butadiene, the improvement which comprises heating the stripped ammoniacal cuprous solution to remove and separate a substantial fraction of the dissolved butadiene, passing the heated solution into the top section of a desorber above an upper plate thereof, removing the butadiene vapor from the top section of the desorber and, recycling this butadiene vapor for said stripping of the ammoniacal cuprous salt solution of the butene, passing the heated stripped ammoniacal cuprous acetate solution after the separation of the first fraction of butadiene down said desorber in countercurrent flow to a second fraction of butadiene obtained by further heating the heated stripped solvent to desorb the remaining fraction of butadiene in a lower part of the desorber below said upper plate of the said desorber, and removing this butadiene as a side stream from the desorber below said upper plate.

2. In a process for the extraction of a diolefin from a mixture of saturated and unsaturated hydrocarbons by means of ammoniacal cuprous acetate solution in which the ammoniacal cuprous acetate solution containing dissolved diolefin and monoolefin after it has contacted and has been been separated from the said mixture of hydrocarbons is stripped of monoolefin by passing in countercurrent flow to the diolefin, the improvement which comprises heating the stripped ammoniacal cuprous solution to remove and separate a substantial fraction of the dissolved diolefin, passing the heated solution into the top section of a desorber above an upper plate thereof, removing the diolefin vapor from the top section of the desorber and recycling this diolefin vapor for said stripping of the ammoniacal cuprous acetate solution of the monoolefin, passing the heated stripped ammoniacal cuprous acetate solution after separation of the first fraction of diolefin down said desorber in countercurrent flow to a second fraction of diolefin obtained by further heating the heated stripped solvent to desorb the remaining fraction of dielefin in a lower part of the desorber below said upper plate of the said desorber, and removing this diolefin as a side stream from the desorber below said upper plate.

RICHARD A. GIVEN.
WILLIAM S. CRAFT.

REFERENCES CITED

The following references are of record in the file of this patent:

UNITED STATES PATENTS

| Number | Name | Date |
|---|---|---|
| 1,422,183 | Curme | July 11, 1922 |
| 1,893,586 | Horsley | Jan. 10, 1933 |
| 2,005,500 | Joshua | June 18, 1935 |
| 2,144,692 | Schuftan | Jan. 24, 1939 |
| 2,188,899 | Hebbard et al. | Feb. 6, 1940 |
| 2,369,559 | Gilliland | Feb. 13, 1945 |
| 2,371,817 | Frey | Mar. 20, 1945 |
| 2,388,928 | Morrell et al. | Nov. 13, 1945 |

FOREIGN PATENTS

| Number | Country | Date |
|---|---|---|
| 532,821 | Great Britain | Jan. 31, 1941 |